US007047741B2

(12) United States Patent
Gray, Jr.

(10) Patent No.: US 7,047,741 B2
(45) Date of Patent: May 23, 2006

(54) METHODS FOR LOW EMISSION, CONTROLLED TEMPERATURE COMBUSTION IN ENGINES WHICH UTILIZE LATE DIRECT CYLINDER INJECTION OF FUEL

(75) Inventor: Charles L. Gray, Jr., Pinckney, MI (US)

(73) Assignee: The United States of America as represented by the Administrator of the Environmental Protection Agency, Washington, DC (US)

( * ) Notice: Subject to any disclaimer, the term of this patent is extended or adjusted under 35 U.S.C. 154(b) by 264 days.

(21) Appl. No.: 10/665,634

(22) Filed: Sep. 19, 2003

(65) Prior Publication Data

US 2004/0061290 A1   Apr. 1, 2004

Related U.S. Application Data

(63) Continuation-in-part of application No. 10/241,229, filed on Sep. 10, 2002, now Pat. No. 6,845,987.

(51) Int. Cl.
*F02D 23/00* (2006.01)
*F02B 31/00* (2006.01)
*F02B 5/00* (2006.01)
*F02B 23/00* (2006.01)

(52) U.S. Cl. .................. 60/603; 60/605.2; 123/301; 123/305; 123/585

(58) Field of Classification Search ............ 60/605.2, 60/600–603; 123/301, 435, 480, 585, 568.26, 123/568.27, 568.28, 305; 73/118.1
See application file for complete search history.

(56) References Cited

U.S. PATENT DOCUMENTS

| 4,727,849 | A | * | 3/1988 | Nishida et al. | ........ | 123/568.27 |
| 4,942,860 | A | * | 7/1990 | Chujo et al. | ........... | 123/568.26 |
| 5,704,340 | A | * | 1/1998 | Togai | ..................... | 123/568.28 |
| 6,000,385 | A | * | 12/1999 | Fukuma | ................. | 123/568.16 |
| 6,067,973 | A | * | 5/2000 | Chanda et al. | .............. | 123/585 |

(Continued)

OTHER PUBLICATIONS

Hideyuki Tsune Moto, et al., The Role of Oxygen in Intake and Exhaust on no Emission, Smoke and BMEP of a Diesel Engine with EGR System, SAE Technical Paper 800030 (1980).

*Primary Examiner*—Thai-Ba Trieu
(74) *Attorney, Agent, or Firm*—David H. Read

(57) ABSTRACT

A method is provided for close control and adjustment of in-cylinder oxygen concentration levels together with boost adjustments to minimize harmful emissions during transients in engines which utilize late direct cylinder injection of fuel. EGR flow rates are adjusted in a closed loop, linked fashion together with boost pressure changes during transients, to maintain intake charge-air oxygen concentration and boost levels within critical ranges for controlled temperature, low emission combustion. Changes in fuel feed into the cylinder are made to wait for or follow changes in the boost level of charge-air into the cylinder for combustion. Temporary fuel levels are not allowed to exceed desired fuel/oxygen ratios during transients, by controlling fuel feed responsive to the level of boost of charge-air being taken into the cylinder for combustion.

21 Claims, 3 Drawing Sheets

U.S. PATENT DOCUMENTS

| | | |
|---|---|---|
| 6,273,076 B1 | 8/2001 | Beck |
| 6,276,334 B1 * | 8/2001 | Flynn et al. ................ 123/435 |
| 6,508,237 B1 | 1/2003 | Romzek .................... 60/605.2 |
| 6,523,529 B1 | 2/2003 | Moncelle |
| 6,550,445 B1 * | 4/2003 | Umezono et al. ........... 123/301 |
| 6,606,979 B1 | 8/2003 | Kimura ...................... 123/305 |
| 6,681,744 B1 * | 1/2004 | Itoyama et al. ............. 123/480 |
| 6,701,244 B1 * | 3/2004 | Oota et al. .................. 123/480 |
| 6,877,369 B1 * | 4/2005 | Matsunaga et al. ........ 73/118.1 |
| 2004/0261414 A1 * | 12/2004 | Araki .......................... 60/602 |

\* cited by examiner

METHODS FOR LOW EMISSION, CONTROLLED TEMPERATURE COMBUSTION IN ENGINES WHICH UTILIZE LATE DIRECT CYLINDER INJECTION OF FUEL

CROSS REFERENCE TO RELATED APPLICATION

This application is a continuation-in-part of U.S. patent application Ser. No. 10/241,229 filed Sep. 10, 2002, now U.S. Pat. No. 6,845,987 which application, in its entirety, is incorporated herein by reference.

BACKGROUND OF THE INVENTION

The present invention relates to methods for controlling combustion processes in engines that utilize late direct cylinder injection of fuel, such as diesel engines, to reduce harmful emissions produced thereby. For ease of reference, this application may at times simplistically refer only to diesel engines, however, the scope of the invention equally applies to other engines that utilize late direct cylinder injection of fuel as well.

Internal combustion engines which utilize late direct cylinder injection of fuel, such as conventional diesel engines, emit harmful pollutants such as nitrogen oxides (NOx) and particulate matter (PM) substantially in excess of acceptable environmental levels. Nevertheless, because of their fuel efficiency, diesel engines remain preferable to gasoline engines for many vehicle applications.

Despite concerted efforts to reduce NOx and PM emissions in diesel engines, the prior art has never been successful in developing a robust diesel combustion system (i.e. providing commercially acceptable responsiveness and power) that is capable of simultaneously maintaining engine-out emission levels of NOx and PM within environmentally acceptable levels across transients. Instead, it is well known that transient changes in the operating conditions of a diesel engine, specifically with regard to adjustment of fuel feed, exhaust gas recirculation (EGR) and turbocharging levels upon vehicle acceleration, can result in significant NOx or PM emissions. Such emissions during transient changes can cause vehicles to fail emission standards even where such vehicles could meet the emission standards at steady state conditions.

It is therefore an object of the present invention to provide an improved method for enabling low emission, controlled temperature combustion, including during transient changes in operating conditions, for engines utilizing late direct cylinder injection of fuel.

DESCRIPTION OF THE RELATED ART

It is known in the prior art that the formation rate of NOx increases exponentially with temperature. Indeed, as is discussed in commonly-owned and pending U.S. patent application Ser. No. 10/214,229, it has been determined that the formation of NOx will be minimal if localized engine combustion temperatures can be maintained below about 2000 degrees Kelvin(K). However, the goal of maintaining combustion temperatures below this level, and yet still obtaining good combustion at practical engine speeds and loads for engines which utilize late direct cylinder injection of fuel, and through transient changes in such operating conditions, has remained elusive to the automotive industry.

In the parent application hereto, improvements were disclosed for controlling combustion temperatures to reduce NOx formation primarily through manipulation and control of boost pressures and intake charge-air oxygen concentrations to limit local temperature increases in combustion. However, a challenge results. For any given engine operating condition, in order for clean combustion to occur, the intake charge-air oxygen concentration levels must be kept within a limited range to be both sufficient for complete combustion (thereby avoiding an increase in PM emissions) and yet insufficient for an unwanted increase in NOx formation. Appropriate control of intake charge-air oxygen concentration can be especially challenging during rapid engine speed and load transitions.

Active control of oxygen concentration in the intake charge-air of a diesel engine is not commonly practiced in the prior art. This is because, while it is known in the prior art that exhaust gas recirculation (EGR) flow rates may be increased to lower combustion temperatures and reduce NOx formation, the role of EGR in reducing NOx formation is widely misunderstood as attributable primarily to heat capacity effects rather than reducing oxygen concentration to limit localized NOx formation rates by locally available oxygen. See, for example, Hideyuki Tsunemoto, et al., The Role of Oxygen in Intake and Exhaust on NO Emission, Smoke and BMEP of a Diesel Engine with EGR System, SAE Technical Paper 800030 (1980); see also, however, U.S. Pat. No. 4,727,849 to Nishida as an example of an EGR system based on oxygen concentration control. As a result, very few methods for controlling intake charge-air oxygen concentration in a diesel engine are disclosed in the prior art.

One example of a prior art disclosed method of control of intake charge-air oxygen concentration in a diesel engine is in patent application publication number 2002/0011240 to Kimura. For example, FIG. 12 of the Kimura publication indicates the use of an EGR rate correction to reduce oxygen concentration to a value of 16% or less for use with a low temperature premix combustion. However, the Kimura publication does not disclose a method for two-way tuning of oxygen concentration levels around a target range during transients (i.e. alternatively making adjustments to raise or lower the oxygen concentration, depending on positive or negative variance from a target oxygen concentration, to maintain oxygen concentration close to a target level). Nor does the Kimura publication disclose a sequential order in which changes in the rate of fuel feed wait for or follow EGR and boost pressure adjustments in order to obtain improved emissions performance during transients.

Other prior art EGR control mechanisms for intake charge-air oxygen control focus on determining and controlling the amount (e.g. mass) of oxygen in the intake charge-air, rather than the oxygen concentration thereof. For example, U.S. Pat. No. 6,508,237 to Romzek discloses control of EGR flow rate, and uses intake oxygen amount calculations to guide adjustments to EGR flow rates and/or boost levels to correct the air/fuel ratios in combustion to desired levels. However, the Romzek patent does not target any particular oxygen concentration level. Nor does the Romzek patent disclose a sequential order in which changes in the rate of fuel feed are constrained to wait for or follow the EGR and boost pressure adjustments. Instead, the Romzek patent discloses that fuel delivery is determined based on engine torque demand as determined by a driver accelerator position sensor, prior to determination of a desired air intake composition and the making of EGR and boost adjustments to meet that target air composition.

U.S. Pat. No. 6,523,529 to Moncelle similarly discusses use of EGR (or, as it enables, a membrane-separated, nitrogen enriched, low oxygen intake composition) as a means to reduce the overall amount (not concentration) of available oxygen to form NOx, which purportedly slows the combustion process and thereby lowers peak combustion temperatures and NOx formation. The Moncelle '529 patent also discloses the use of pressurization of intake air through a turbocharger to increase the amount of oxygen available for combustion. However, the Moncelle '529 patent does not discuss methods for control of oxygen concentration to a desired level. Nor does the Moncelle patent discuss the sequential order in which EGR adjustments, boost pressure adjustments, and fuel feed adjustments should be performed.

U.S. Pat. No. 6,273,076 to Beck also discloses a method for continuous adjustments to EGR flow rates, boost pressure levels, and other engine operating conditions in order to optimize fuel/air ratios and combustion temperatures for low NOx formation. However, the Beck '076 patent does not control oxygen concentration levels, nor does it discuss any linking of EGR adjustments and boost pressure adjustments to increase or decrease together in sequence or in tandem, nor does it discuss or take into account the interrelationship of adjustments to EGR flow rates and charge-air mass and air/fuel mass ratios. Instead, the goal in the Beck patent is to simply adjust the air levels to obtain a target air/fuel ratio for the given fuel quantity required for a particular torque demand. The Beck patent also provides (e.g., in FIG. 11 thereof) that fuel supply is first adjusted (to the amount as required for a particular operating point) before adjustments of air supply, not vice versa.

Therefore, a novel intelligent system for close control and adjustment of in-cylinder oxygen concentration levels, sequenced together with charge-air density controls in such a way as to minimize harmful emissions during transients, is needed for successful implementation of a low emission controlled temperature combustion engine.

SUMMARY OF THE INVENTION

The present invention provides an effective method for close control and adjustment of in-cylinder oxygen concentration levels together with boost adjustments in such a way as to minimize harmful emissions during transients in engines which utilize late direct cylinder injection of fuel. In one aspect of this invention, EGR flow rates are adjusted by means of an EGR control valve in a closed loop, linked fashion together with boost pressure changes during transients, to maintain intake charge-air oxygen concentration and boost levels preferably within critical ranges for controlled temperature, low emission combustion at all times.

Furthermore, as another aspect of this invention, in order to minimize harmful emissions during rapid transient changes in operating conditions (e.g. vehicle acceleration), corresponding increases in fuel feed into the cylinder are constrained to wait for or follow with boost adjustments. In this manner, during acceleration, increase in boost pressure and charge-air density enable the increase in fuel feed to respond to the driver's demand for more torque. Prior art diesel engines, to the contrary, have fuel feed adjustments take place prior to (i.e. "lead") the adjustments in boost. However, the inventor has found that if fuel feed increases lead the boost increases, it is more difficult to avoid having temporary fuel levels in excess of desired fuel/oxygen ratios, with the result of increased PM levels from insufficient oxygen for good, complete combustion. This problem may most easily be avoided by having fuel feed adjustments wait for or follow boost changes instead, determining and injecting a fuel quantity responsive to the instant pressure of the boosted charge-air being taken into the cylinder for the particular combustion cycle.

DETAILED DESCRIPTION OF THE INVENTION

Figure 1:
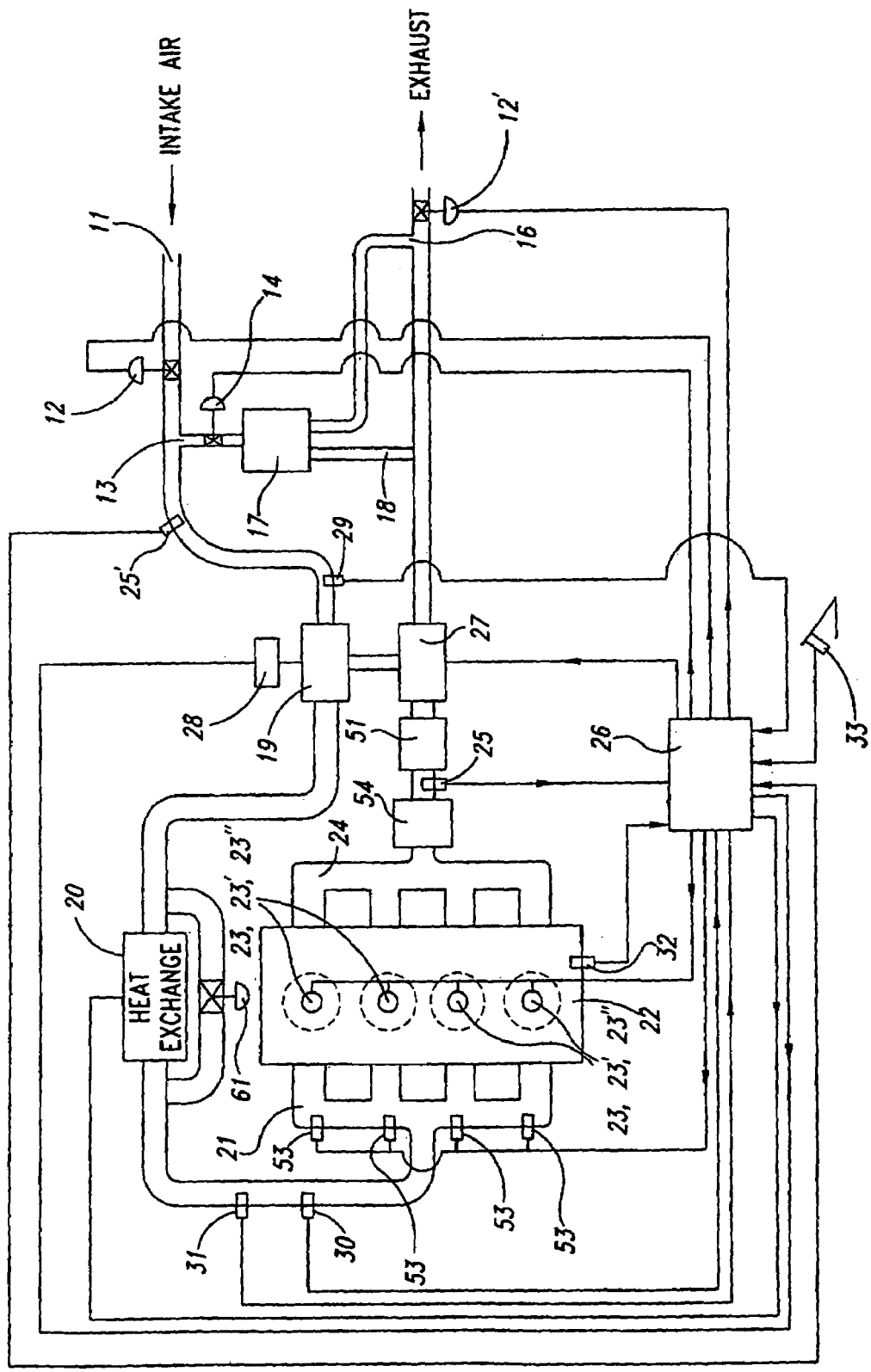
FIG. 1 is a schematic view of the preferred embodiment of the combustion system of the present invention.

The Importance of Boost Control for Controlled Temperature Combustion

As discussed in the parent application hereto (U.S. patent application Ser. No. 10/214,229), for a given quantity of fuel to be burned, assuming adiabatic combustion, the final combustion temperature, $T_3$, is in the form of $T_3=T_2+H_c/C_v$ (where $T_2$ is the final compression temperature, $H_c$=heat released from combustion of the fuel, and $C_v$ is the total heat capacity of the charge-air fuel mixture, i.e., the mass of the mixture times the specific heat capacity). A goal to minimize NOx formation is to lower and control $T_3$ (to 2000° Kelvin, for example). Since for a given quantity of fuel burned, $H_c$ is fixed, the only variable to control $T_3$ is $C_v$. If $C_v$ is large, $T_3$ will be lower.

Given the foregoing, one known strategy for lowering and controlling peak combustion temperatures is by adjusting the heat capacity of the charge-air fuel mixture. However, given the above equations, for $T_3$ to be controlled to a stable level, $H_c/C_v$ must be maintained and controlled to a stable level. For a given combustion system, $H_c$ generally is directly proportional to the quantity of fuel burned. Therefore, to maintain and control $H_c/C_v$ to be constant (or stable to within an acceptable range), $C_v$ must increase proportionally as the quantity of fuel combusted is increased. Since $C_v$ is of the form $C_v=c_vM$ (where $c_v$ is the specific heat capacity of the charge-air fuel mixture and M is the mass of the charge-air fuel mixture), $C_v$ may be increased or decreased by manipulation of M. M, in turn, may be increased or decreased by controlling the boost pressure of the charge-air in the intake system, thereby controlling the charge-air density.

Therefore, by nature of the chain of relationships set forth above (and as set forth in greater detail in the parent application hereto), a necessary condition for combustion temperature to be controlled is manipulation of the boost pressure of the charge-air in the intake system. This finding opens possibilities for significant reduction of NOx formation through manipulation of boost pressure in internal combustion engines.

The Importance of Controlling Intake Charge-Air Oxygen Concentration to Obtain Low Emission, Controlled Temperature Combustion.

Notwithstanding the foregoing, mere adjustments to boost pressure alone will not succeed in obtaining sufficiently low emissions in controlled temperature combustion in engines that utilize late direct cylinder fuel injection. Instead, as will be discussed hereafter, for low emission controlled temperature combustion in such engines, intake charge-air oxygen concentration must also be controlled and maintained within a target range in order to disperse and constrain localized heat release and temperature increases in combustion that will otherwise result in significant localized NOx formation.

Maintaining intake charge-air oxygen concentration levels within an acceptable range is critical for low emission controlled temperature combustion in engines that utilize late direct cylinder injection of fuel. Indeed, for any given engine operating condition, there exists a corresponding range of intake charge oxygen concentration sufficient to enable rapid and substantially complete combustion, but not too much so as to result in a significant increase in NOx formation. For example, if the oxygen concentration is too low for a quantity of fuel, incomplete combustion and an undesirable increase in smoke/PM will occur. On the other hand, if the oxygen concentration is too high for a quantity of fuel, significant local formation of NOx will occur. This is because the local temperature rise which directly determines the NOx formation rate is limited by locally available oxygen. Thus, to limit local temperatures, local oxygen concentration must be controlled.

The appropriate "range" of intake charge-air oxygen concentration depends on the extent of optimization of the combustion system and on the engine's given operating conditions at the time. For example, the appropriate range might vary from an intake charge-air oxygen concentration level as low as about 10%, up to around 18%. In a preferred embodiment, however, in order to substantially eliminate NOx formation, intake charge-air oxygen concentration is kept within a low, tighter range at most engine speeds and loads, preferably maintaining intake charge-air oxygen concentration levels within a range of 12% to 13% or 14%. At low engine loads, a higher intake oxygen concentration than this may be used without an adverse effect on emissions. Whatever the resulting desired range is for intake charge-air oxygen concentration in the combustion system used, maintaining intake charge oxygen concentration within this desired range over all normal operating conditions is essential for maintaining low levels of NOx and PM/smoke emissions for those operating conditions.

Controlling Intake Charge-Air Oxygen Concentration and Density Together.

In the present invention, EGR flow rates are appropriately adjusted together with boost pressure changes to respective values that achieve target oxygen concentration levels and charge-air boost pressure levels conducive to obtaining good, low-emission combustion at controlled temperatures to ensure low NOx and low PM/smoke combustion. Fuel is then injected responsive to the instant pressure level of boosted charge-air being taken into the cylinder for combustion (considering charge-air temperature). The preferred configuration for implementation of the present invention follows hereafter, with reference to the Figures likewise presented herein.

Referring to FIG. 1, internal combustion engine 22 is shown, preferably utilizing late direct cylinder fuel injection with a fuel with a relatively low auto-ignition temperature like conventional diesel fuel. Fuel is supplied to engine 22 through direct cylinder fuel injectors 23, 23', 23", etc. Ambient air enters at port 11 and its flow may be throttled by optional valve 12. Exhaust gas is mixed with the intake ambient air at port 13, thereby forming an intake charge-air mixture. Exhaust gas is routed from the exhaust pipe at port 16 through exhaust gas cooler 17 to port 13, with optional condensate return-to-exhaust line 18 (regulated by optional exhaust gas flow control valve 14). The primary exhaust gas recirculation (EGR) control valve 12' is located just downstream of port 16 in the exhaust pipe. By restricting flow through EGR-regulating control valve 12', the EGR flow rate through ports 16 and 13 is controlled.

Operation of the EGR-regulating control valve preferably proceeds through advanced closed loop feedback control methods, allowing close control of valve 12' to control EGR flow rates, coordinated with the adjustments in boost. Oxygen concentration control of the charge-air mixture after port 13 is thereby enabled by taking advantage of the fact that oxygen concentration in recirculated exhaust gas is lower than in ambient air, and thus the overall oxygen concentration level for any charge-air mixture may be efficiently controlled within a range by adjusting the ratio between ambient air and EGR. For example, restricting exhaust exit valve 12' will increase the EGR flow rate back to the engine. By this, or any other EGR control valve mechanism, since oxygen concentration in EGR is lower than ambient air, the increase in EGR return flow rate results in a reduction of intake charge-air oxygen concentration. The resulting intake charge-air oxygen concentration may be determined by either optional direct oxygen sensor 25', or calculated from other sensed parameters, by methods well-known to one skilled in the art.

Preferably downstream of port 13, using a low pressure EGR loop, the EGR/ambient air ("charge-air") mixture flows through and is compressed by compressor 19. Alternatively, a high pressure EGR loop may be used if desired, as will be understood in the art. Compressor 19 may be a single stage compressor such as a Variable Geometry Turbocharger (VGT), or two or more compressors in series or parallel, and is primarily driven by exhaust gas expander motor 27 to provide a controlled boost pressure level to intake manifold 21.

The extent of compression of the charge-air mixture (i.e. the desired boost) is preferably controlled to be responsive to a driver's demand for power. For example, in the event of a change in the driver's demand for power, a change in pedal position is communicated to controller 26 by accelerator pedal sensor 33. Such change in pedal position corresponds to a desired change in engine load as determined by controller 26. The determined desired engine load in addition corresponds to a desired boost level as contained in tables stored within the memory of controller 26. Therefore, controller 26 may then transmit appropriate signals to control boost, such as by sending a signal to expander motor 27 (e.g. to adjust the vane position, in the event of use of a VGT). An optional electric or hydraulic motor 28 may also be used and controlled by controller 26 to provide rapid boost level changes to assist in providing rapid torque response. In such an embodiment, controller 26 therefore sends appropriate signals to motor 28 to control boost level during transients and during any operating conditions where expander motor 27 alone cannot supply sufficient boost pressure.

The resulting instant boost pressure level obtained from compressor 19 may then be determined by boost charge-air pressure sensor 31, and adjustments to boost levels may then be adjusted and coordinated with fuel and EGR adjustments to respond to transient changes in operating conditions as will be discussed later.

Downstream of compressor 19, the compressed charge-air flows through cooler 20 to intake manifold 21. Cooler 20 optionally contains a by-pass line and a by-pass control valve 61, with controller 26 adjusting the control valve 61 to control charge-air temperature. Charge-air temperature may be determined by optional temperature sensor 30 for input to controller 26. Cooler 20 cools the charge-air to preferred charge-air temperature levels if desired.

Optional port fuel-injectors 53 may be used in conjunction with direct fuel injectors 23 to minimize particulate formation and to rapidly adjust fuel injection levels if desired. As stated above, optional oxygen sensor 25' may be used to directly determine the oxygen concentration in the charge-air. Alternatively, the intake charge-air oxygen concentration may be calculated based in part on readings from an exhaust oxygen sensor 25, or calculated or determined from other sensed parameters (not necessarily shown) by methods well-known to those skilled in the art. Optional charge-air mass flow sensor 29 may also be used to provide faster and more accurate engine control. For each of the sensors used herein, the location where the sensors are placed may vary, depending on desired response times and other factors, as will be well understood in the art.

Charge-air enters the combustion chamber (not shown) through conventional valves (not shown) in a conventional manner and exhaust gases leave the combustion chamber through conventional valves (not shown) and leave engine 22 through exhaust manifold 24. Exhaust particulate trap oxidizer 54 removes any particulate emissions and catalyst 51 oxidizes residual fuel and carbon monoxide. Engine speed is provided to controller 26 by speed sensor 32.

As to the method of operation of the present invention, it is preferred that maps are established and stored in the controller 26 to specify the optimum boost level, optimum (or a desired range for) intake charge-air oxygen concentration, and desired fuel rate for each speed and load over which the engine is specified to operate, to maintain the localized combustion temperatures below significant NOx-forming levels. Boost and fuel adjustments are coordinated to meet transient changes in engine operating conditions, such as an increase in driver demand for power (e.g. acceleration).

In particular, for open loop operation, controller 26 reads torque command from pedal sensor 33 and actual engine speed from speed sensor 32. For an increased torque command, controller 26 commands EGR control valve 12' to the position from stored maps appropriate to achieve the desired intake charge-air and exhaust oxygen concentrations. Controller 26 commands expander motor 27 (and, if needed, compressor motor 28) to increase boost pressure level to the new target from stored maps associated with the commanded torque at the measured engine speed. The controller 26 reads actual boost level from sensor 31 and actual intake charge-air temperature from sensor 30, and from stored maps commands the appropriate fuel rate.

Alternatively, for more accurate engine control, closed-loop control loops may be utilized. Exhaust oxygen concentration may be read from sensor 25 and/or intake charge-air oxygen concentration may be read from sensor 25', with controller 26 comparing the actual or calculated (i.e. determined) charge-air oxygen concentration to the desired level for the actual operating point (from stored maps) and commanding EGR control valve 12' to adjust to achieve the target oxygen concentration. Actual boost level from sensor 31 may be compared by controller 26 to the desired level from stored maps and motors 27 and 28 adjusted as appropriate to achieve the target boost level. In like manner, if desired, actual intake charge-air temperature from sensor 30 may also be compared by controller 26 to a desired temperature from stored maps and cooler 20 by-pass control valve 61 adjusted as appropriate to achieve such desired charge-air temperature. Fuel flow rate may also be adjusted based on the actual readings (fuel flow rate sensors not shown) to achieve the target fuel rate.

Whether by an open loop or closed loop control system, the preferred sequence of steps in making said adjustments in the present invention is for adjustment of the EGR control valve (if necessary, to be sure that the resulting charge-air oxygen concentration will be within the desired range) to come first, followed by turbocharging adjustments, and then fuel feed adjustments consistent with the instant determined boost pressure (considering intake charge-air temperature). As stated above, however, most important in the sequence is that any increases in the fuel feed rate wait for or follow with (i.e. be constrained by) the concurrent increases in boost pressure, instead of leading the boost as is done in prior art diesel engines. This is to avoid having temporary fuel levels in excess of desired fuel/oxygen ratios, with resulting increased PM levels, as discussed above. While it is possible for the system to work acceptably with fuel leading the boost at minimal amounts of fuel increases and longer lead time to avoid any significant temporary fuel excess in fuel/oxygen levels while the boost and EGR flow rate are increased, the problem may most easily be avoided by having fuel feed changes wait for or follow boost changes instead.

Figure 2:
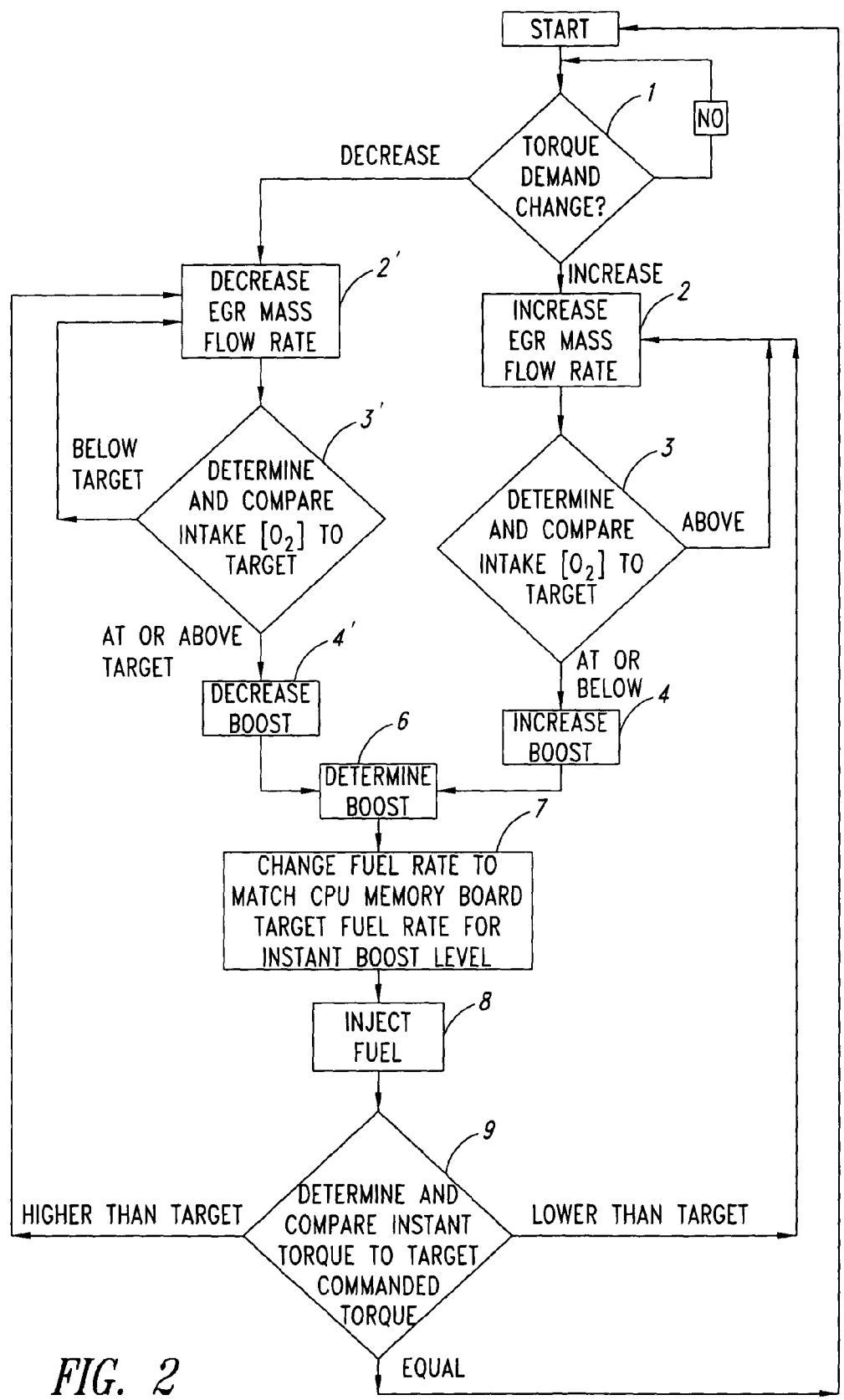
FIG. 2 is a flow chart of the preferred method of the present invention.

FIG. 2 presents a flow diagram illustrating the preferred method of the present invention. Therefore, referring to FIG. 2, in step 1, it is first determined whether there has been a torque demand change, performed by controller 26 reading torque command from pedal sensor 33 (and actual engine speed from speed sensor 32). If there has been a torque demand change, controller 26 commands appropriate adjustments in EGR control valve 12' to increase (step 2) or decrease (step 2') EGR mass flow rates respectively to adjust the intake charge-air oxygen concentration toward desired levels. In steps 3 or 3', the intake (or charge-air) oxygen concentration is determined as read from sensor 25' or by other sensor and calculations means well-known in the prior art. Controller 26 then compares the instant determined intake oxygen concentration to the desired level for the actual operating point provided from stored maps in controller 26. Steps 2 and 2' form a loop with steps 3 and 3' of adjusting and comparing intake oxygen concentration toward target levels until the intake oxygen concentration reaches the target oxygen concentration level.

After confirming that the intake oxygen concentration has reached the target oxygen concentration, boost adjustments are made. For example, if an increase in torque demand was determined in step 1, in step 4 controller 26 commands adjustments to expander motor 27 and (if needed) compressor motor 28 to increase boost pressure level toward the target provided to controller 26 from stored maps associated with the commanded torque at the measured engine speed. Similarly, if a decrease in torque demand was determined in step 1, in step 4' controller 26 commands adjustments to expander motor 27 and (if needed) compressor motor 28 to decrease boost pressure level toward the target provided to controller 26 from stored maps associated with the commanded torque at the measured engine speed. Alternatively, for rapid torque reduction commands, fuel rate reduction may proceed more quickly than boost and EGR rate reductions since there will be excess charge mass and NOx formation will be even lower. In either case, actual boost level from sensor 31 is then sensed in step 6 for comparison by controller 26 to the desired boost level from stored maps.

Upon completion of the boost adjustments above, in step 7 controller 26 determines an appropriate fuel demand to match the determined boost pressure. Fuel is then injected by direct cylinder fuel injectors 23 into the cylinder in step 8. Thereafter, torque output may be determined in step 9 based on fuel rate or boost level. Present torque output may then be compared with current torque demand (as in step 1), with the loop repeating as appropriate to adapt to the current torque demand.

Figure 3:
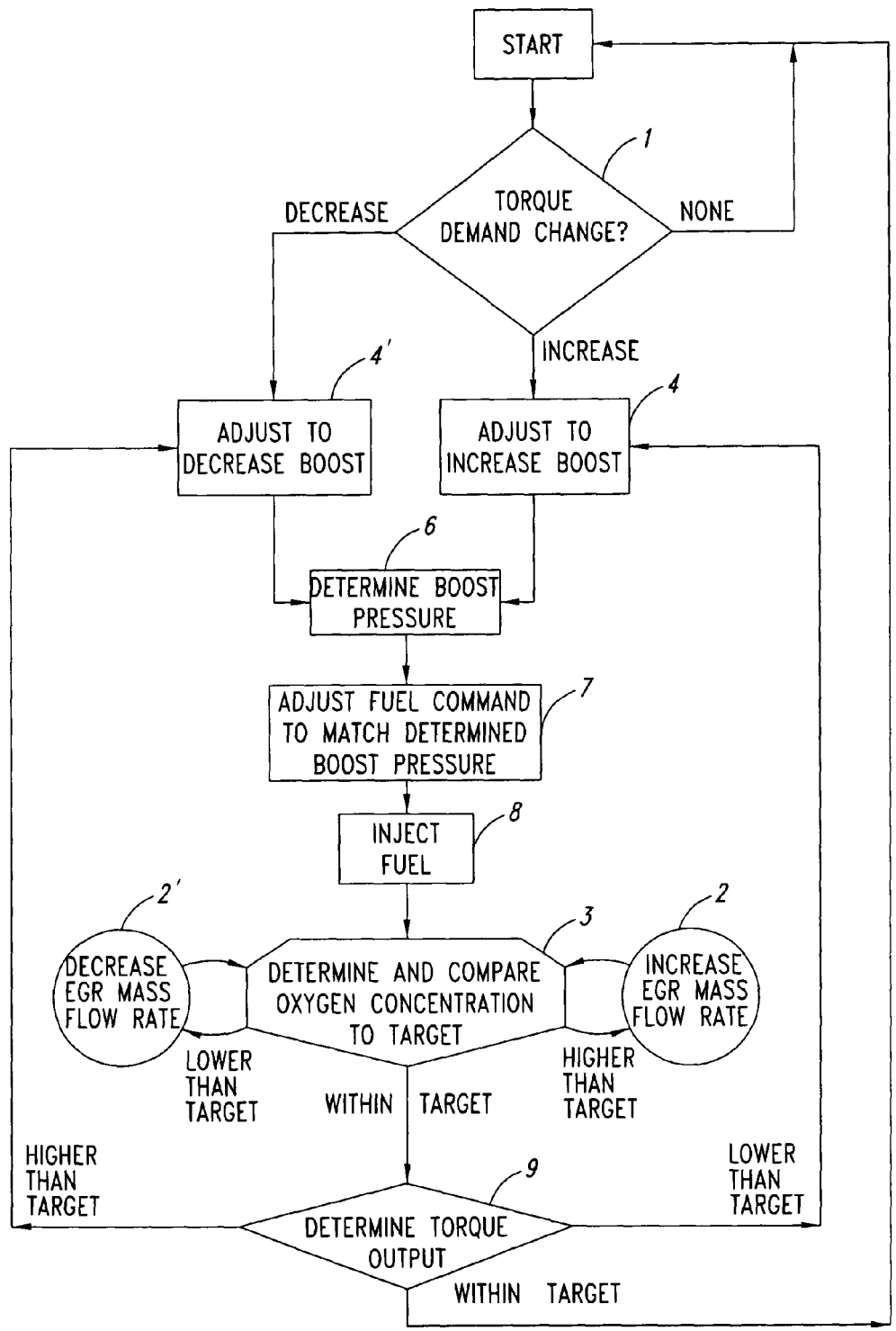
FIG. 3 is a flow chart of an alternative method of the present invention.

An alternative method to that disclosed in FIG. 2 is presented and considered in FIG. 3.

FIG. 3. The method presented in FIG. 3 follows the same steps 1 through 9 as shown in the preferred method presented in FIG. 2, but in a different order. The primary difference from FIG. 2 in the alternative method presented in FIG. 3 is that upon a change in torque demand, boost levels are adjusted first instead of EGR mass flow rates. It should be noted, however, that boost levels and EGR levels are essentially adjusted together in both Figures since the controller's loops are much faster than the response characteristics of the boost or EGR systems. Otherwise, the rest of the method remains similar to the preferred method in FIG. 2. Thus, in the method presented in FIG. 3, upon sensing of an increase or decrease in a demand for torque in step 1, a corresponding increase or decrease in boost directly follows in steps 4 (or 4'). Actual boost is determined in step 6. Fuel is then injected in steps 7 and 8 corresponding to the instant boost. For each of these embodiments, the matching of fuel feed to the instant boost level takes into consideration the charge-air temperature, in order to correct for corresponding density changes; preferably, charge-air temperature is controlled to a target temperature for each load (i.e. boost level).

Intake oxygen concentration is then determined in step 3, leading to adjustments of EGR flow rate (by increase in step 2 or decrease in step 2', respectively) until the intake charge-air oxygen concentration is determined to be within the target oxygen concentration range for that given time. Torque is then determined and compared with driver demand, with return loops following thereafter, as shown in step 9.

In addition, at times, additional considerations in obtaining a desired charge-air oxygen concentration may need to be taken into account. For example, in the event of use of a high pressure EGR system, with boost provided by compression of ambient air alone instead of a charge-air mix, adjustments in boost will cause variance in the resulting charge-air oxygen concentrations. Similar situations may exist in a low pressure EGR system as well, such as if boost changes are allowed to get ahead of EGR flow rate changes, which would also result in the boost adjustments causing increased variance in resulting charge-air oxygen concentrations.

This additional challenge may be illustrated in a more specific fashion by providing a situation where there is a demand for more torque by the driver. In such a case, the increase in engine load requires a greater quantity of fuel to be combusted. As discussed above, to maintain combustion temperature at a controlled level, $C_v$ must increase proportionally with the increase in fuel quantity, which means M must be proportionally increased by increasing the boost pressure in the intake charge. However, since the volume of charge-air taken into the cylinder remains constant, the corresponding increase in charge-air density, if satisfied only (or disproportionately) by compressing ambient air, creates an increase in both the total moles of oxygen and the oxygen concentration taken into the combustion cylinder. Thus the increase in boost pressure may cause the oxygen concentration level of the charge-air to be taken into the cylinder to drift outside of the desired concentration range. The resulting problem is how to continue to control the oxygen concentration levels without undermining the correction in density (boost) needed for the intake charge to control bulk combustion temperature.

This challenge may be addressed by preempting or offsetting the variance effects on oxygen concentration caused by an increase or decrease in boost pressure by a additional counteracting adjustment in oxygen concentration through changing the mass flow rate of exhaust gas that is recirculated to the engine. In other words, in addition to an EGR adjustment in proportion to a change in boost, the EGR control valve 12' may be adjusted by an additional increment to compensate for oxygen concentration variations anticipated to occur with the boost adjustments. This allows for a corresponding and counteracting increase in boost and intake air flow rate to increase charge-air oxygen concentration back to the desired level, with the increase in boost and charge-air density allowing an increase in fuel feed, without increasing combustion temperature, to respond to the driver's demand for more torque.

From the foregoing it will also be appreciated that, although specific embodiments of the invention have been set forth herein, various modifications may be made without deviating from the spirit and scope of the invention. The embodiments presented herein are therefore to be considered as illustrative and not restrictive, with the scope of the invention indicated as limited only by the claims appended hereto.

I claim:

1. A method for combustion in a fuel combustion engine which utilizes late direct injection of fuel into a combustion chamber, comprising:
   maintaining oxygen concentration in a charge-air mixture for combustion within a desired oxygen concentration range;
   compressing the charge-air mixture;
   determining the resulting boost pressure of the compressed charge-air mixture;
   taking the compressed charge-air mixture into the combustion chamber;
   directly injecting a quantity of fuel into the combustion chamber responsive to the determined boost pressure of the compressed charge-air mixture; and
   combusting the fuel and charge-air mixture in the combustion chamber.

2. The method of claim 1, wherein the desired oxygen concentration range is a range located somewhere between 10% and 18%.

3. The method of claim 1, wherein the desired oxygen concentration range is a range between 12% and 14%.

4. The method of claim 1, wherein the charge-air mixture is formed by means of a low pressure EGR loop.

5. The method of claim 1, further comprising:
   determining the temperature of the compressed charge-air mixture;
   matching the quantity of fuel injected into the combustion chamber to the density of the charge-air mixture, as determined from the boost pressure and temperature of the compressed charge-air mixture.

6. The method of claim 5, further comprising regulating the temperature of the compressed charge-air mixture to a desired temperature range.

7. The method of claim 1, further comprising:
   determining a demand for power to be produced by the engine;
   compressing the charge-air mixture to a desired charge-air boost pressure corresponding to the determined demand for power; and directly injecting a quantity of fuel into the engine cylinder, in a quantity corresponding to the desired charge-air boost pressure.

8. A method of operating an internal combustion engine, in a motor vehicle, which utilizes direct injection of fuel into a combustion chamber, comprising:
   combining recirculated exhaust gas with ambient air to form a charge-air mixture;
   adjusting the oxygen concentration of the charge-air mixture, to fall within a desired oxygen concentration range;
   determining a demand for power to be produced by the internal combustion engine;
   determining a desired charge-air boost pressure corresponding to said demand for power;
   compressing the charge-air mixture to, or nearer to, the desired charge-air boost pressure;
   determining the boost pressure of the compressed charge-air mixture;
   taking the compressed charge-air mixture into a cylinder of the engine for combustion;
   determining a desired quantity of fuel for combustion corresponding to the determined charge-air boost pressure of the compressed charge-air mixture;
   injecting the desired quantity of fuel directly into the engine cylinder; and
   combusting the fuel and charge-air mixture within the engine cylinder.

9. The method according to claim 8, wherein the desired oxygen concentration range is a range located somewhere between 10% and 18%.

10. The method of claim 8, wherein the desired oxygen concentration range is a range between 12% and 14%.

11. The method of claim 8, wherein the charge-air mixture is formed by means of a low pressure EGR loop.

12. The method of claim 8, further comprising:
   determining the temperature of the compressed charge-air mixture;
   matching the desired quantity of fuel injected into the combustion chamber to the density of the charge-air mixture, as determined from the boost pressure and temperature of the compressed charge-air mixture.

13. The method of claim 12, further comprising regulating the temperature of the compressed charge-air mixture to a desired temperature range.

14. A direct injection internal combustion engine, comprising:
   a plurality of cylinders, each cylinder providing a combustion chamber;
   an exhaust gas recirculation system in operative communication with said cylinders, for combining with ambient air a portion of exhaust gas produced from said combustion chambers to form a charge-air mixture, and returning said charge-air mixture to said cylinders for combustion;
   a boost system in operative communication with said exhaust gas recirculation system, for compressing said ambient air or charge-air mixture before taking in said charge-air mixture into said cylinders for combustion;
   a fuel injection system in operative communication with the cylinders, for injecting fuel into each of said cylinders for combustion;
   a controller for adjusting operation of the exhaust gas recirculation system, boost system and fuel injection system, programmed to:
      (1) make adjustments to said exhaust gas recirculation system to control the oxygen concentration of the charge-air mixture to within a target range;
      (2) make adjustments to said boost system to control the boost pressure of the charge-air mixture responsive to a demand for power from the engine; and
      (3) regulate the amount of fuel injected into each cylinder responsive to the boost pressure of the charge-air mixture.

15. The engine of claim 14, wherein the amount of fuel injected into each cylinder is regulated to be directly responsive to the instant sensed boost pressure, with consideration of charge-air temperature, of the compressed charge-air mixture after compression by the boost system.

16. The engine of claim 14, wherein the target oxygen concentration range is a range located somewhere between 10% and 18%.

17. The engine of claim 14, wherein the target oxygen concentration range is a range between 12% and 14%.

18. The engine of claim 14, wherein the exhaust gas recirculation system forms the charge-air mixture by means of an exhaust exit control valve and low pressure EGR loop.

19. The engine of claim 14, wherein the fuel injection system injects fuel directly into the cylinders late in a compression stroke so as to create stratified, non-premixed combustion.

20. The engine of claim 14, wherein the controller is further programmed to determine the temperature of the compressed charge-air mixture and regulate the amount of fuel injected into each cylinder to the density of the charge-air mixture, as determined from the boost pressure and temperature of the compressed charge-air mixture.

21. The engine of claim 14, wherein the controller is further programmed to regulate the temperature of the compressed charge-air mixture to a desired temperature range.

* * * * *